United States Patent [19]

Sato

[11] Patent Number: 5,199,779
[45] Date of Patent: Apr. 6, 1993

[54] PROJECTION-TYPE VEHICULAR HEADLAMP

[75] Inventor: Masakazu Sato, Shizuoka, Japan

[73] Assignee: Koito Manufacturing Co., Ltd., Tokyo, Japan

[21] Appl. No.: 826,963

[22] Filed: Jan. 28, 1992

[30] Foreign Application Priority Data

Feb. 8, 1991 [JP] Japan .................................. 3-17647

[51] Int. Cl.$^5$ .............................................. B60Q 1/04
[52] U.S. Cl. ..................................... 362/61; 362/297
[58] Field of Search ................................. 362/61, 297

[56] References Cited

U.S. PATENT DOCUMENTS

| 4,727,458 | 2/1988 | Droste et al. | |
| 4,799,131 | 1/1989 | Aho et al. | 362/61 |
| 5,021,930 | 6/1991 | Yamada | 362/61 |
| 5,047,903 | 9/1991 | Choji | 362/61 |

FOREIGN PATENT DOCUMENTS 2245355  6/1991  United Kingdom .

Primary Examiner—Allen M. Ostrager
Attorney, Agent, or Firm—Sughrue, Mion, Zinn, Macpeak & Seas

[57] ABSTRACT

A projection-type vehicular headlamp which is free from the difficulty of an unwanted light beam being formed by an inclined front lens and cover provided in the lamp body. A light projecting unit including a substantially ellipsoidal mirror in which a light source is fitted, and a projecting lens arranged in front of the light source for converting the output light beam of the light source reflected from the mirror into a substantially parallel light beam advancing forwardly of the headlamp are mounted in a lamp chamber formed by a lamp body and a front lens, the latter being an inclined lens the lens surface of which is inclined strongly rearward. A cover coated with a light reflecting film surrounds the front portion of the light projecting unit, the cover having a lower edge portion extending forward into a front extension. A light diffusing region is formed at least in the front end portion of the front extension of the cover.

13 Claims, 3 Drawing Sheets

PROJECTION-TYPE VEHICULAR HEADLAMP

BACKGROUND OF THE INVENTION

The present invention relates to a projection-type vehicular headlamp employing a light projecting unit in which the output light beam of a light source is reflected from a substantially ellipsoidal mirror and projected forward through a projecting lens. More particularly, the invention relates to a projection-type vehicular headlamp in which a cover coated with a light-reflecting film is provided inside the lamp body surrounding the forward portion of a light projecting unit.

An example of a conventional vehicular headlamp of this type is shown in FIG. 5. In this headlamp, a lamp body 1 and a front lens form a lamp chamber, in which is mounted a light projecting unit 3 including a light source 3a, a substantially ellipsoidal mirror 3a, and a projecting lens 3c. The output light beam of the light source, after being reflected from the mirror 3, is converted into a substantially parallel light beam by the front lens 2 and projected forward of the lamp.

Recent automotive design trends have dictated streamlined vehicle bodies. Therefore, vehicular headlamps to be installed on such streamlined vehicle bodies must themselves have a streamlined design so as to conform with the configuration of the vehicle bodies. Specifically, in such headlamps the front lens 2 is designed so that its lens region 2a is steeply inclined in the rearward direction. In FIG. 5, reference numeral 7 designates a cover which is provided around the light reflecting unit 3. The cover 7 is coated with a light reflecting film, so that the inside of the lamp chamber appears metallic in color. That is, the provision of the cover makes the headlamp excellent in appearance when turned off.

However, the above-described conventional headlamp is disadvantageous in that, as mentioned above, the front lens 2 is strongly inclined. Particularly, the conventional headlamp suffers a problem in that part of the light beam emerging from the projecting lens 3c is first reflected by the front lens 2 and then reflected by the cover 7, so that this portion of the light emerges as an unwanted light beam causing glare.

SUMMARY OF THE INVENTION

In view of the foregoing, an object of the invention is to provide a projection-type vehicular headlamp which is free from the difficulty that the inclined front lens and the cover coated with a light reflecting film form an unwanted light beam.

The foregoing and other objects of the invention have been achieved by the provision of a projection-type vehicular headlamp in which a light projecting unit, which comprises a substantially ellipsoidal mirror in which a light source is fitted and a projecting lens arranged in front of the light source for converting the output light beam of the light source reflected from the mirror into a substantially parallel light beam advancing forwardly of the headlamp, is provided in a lamp chamber formed by a lamp body and a front lens, the front lens being an inclined lens, the lens surface of which is inclined strongly rearward, and a cover coated with a light reflecting film surrounding a forward portion of the light projecting unit, the cover having a lower edge portion extending forward into a front extension, in which, according to the invention, a light diffusing region is formed at least in the front end portion of the front extension of the cover. The light beam reflected from the inclined lens surface of the front lens is diffused by the light diffusing region formed in the front extension of the cover.

DESCRIPTION OF THE PREFERRED EMBODIMENTS

Preferred embodiments of the invention will be described with reference to the accompanying drawings.

Figure 1:
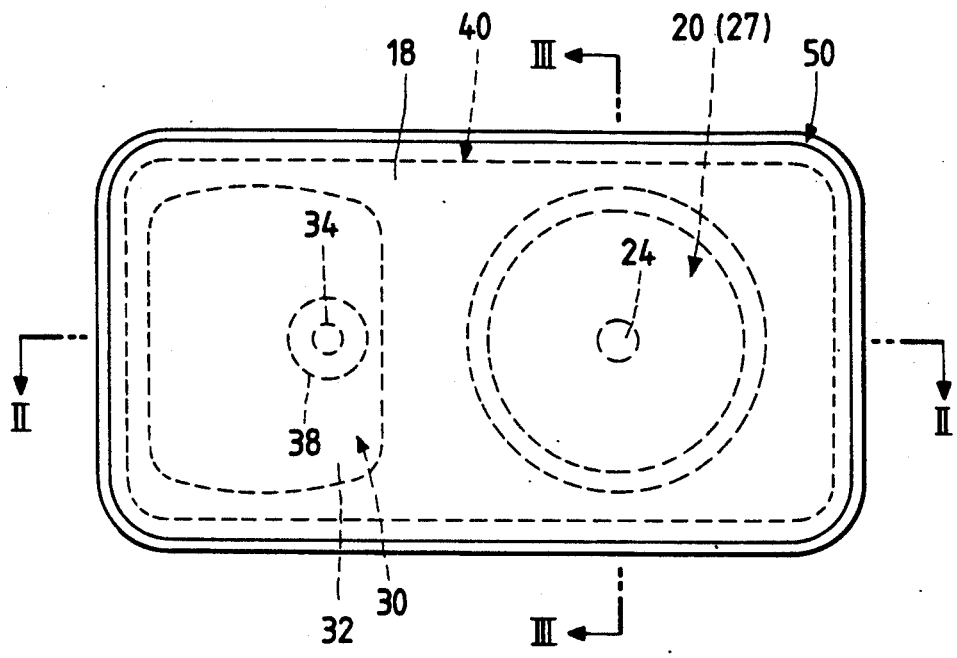
FIG. 1 is a front view of a preferred embodiment of a projection-type vehicular headlamp constructed in accordance with the invention.
Figure 2:
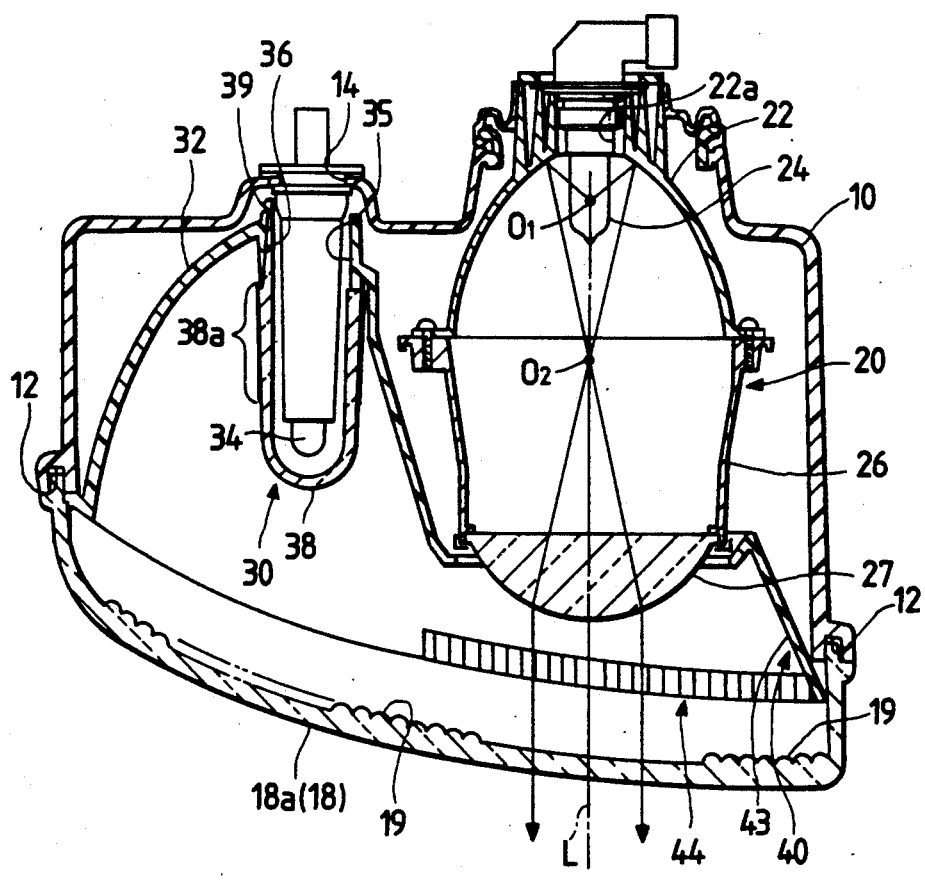
FIG. 2 is a horizontal sectional view of the headlamp shown in FIG. 1 taken along a line II—II in FIG. 1.
Figure 3:
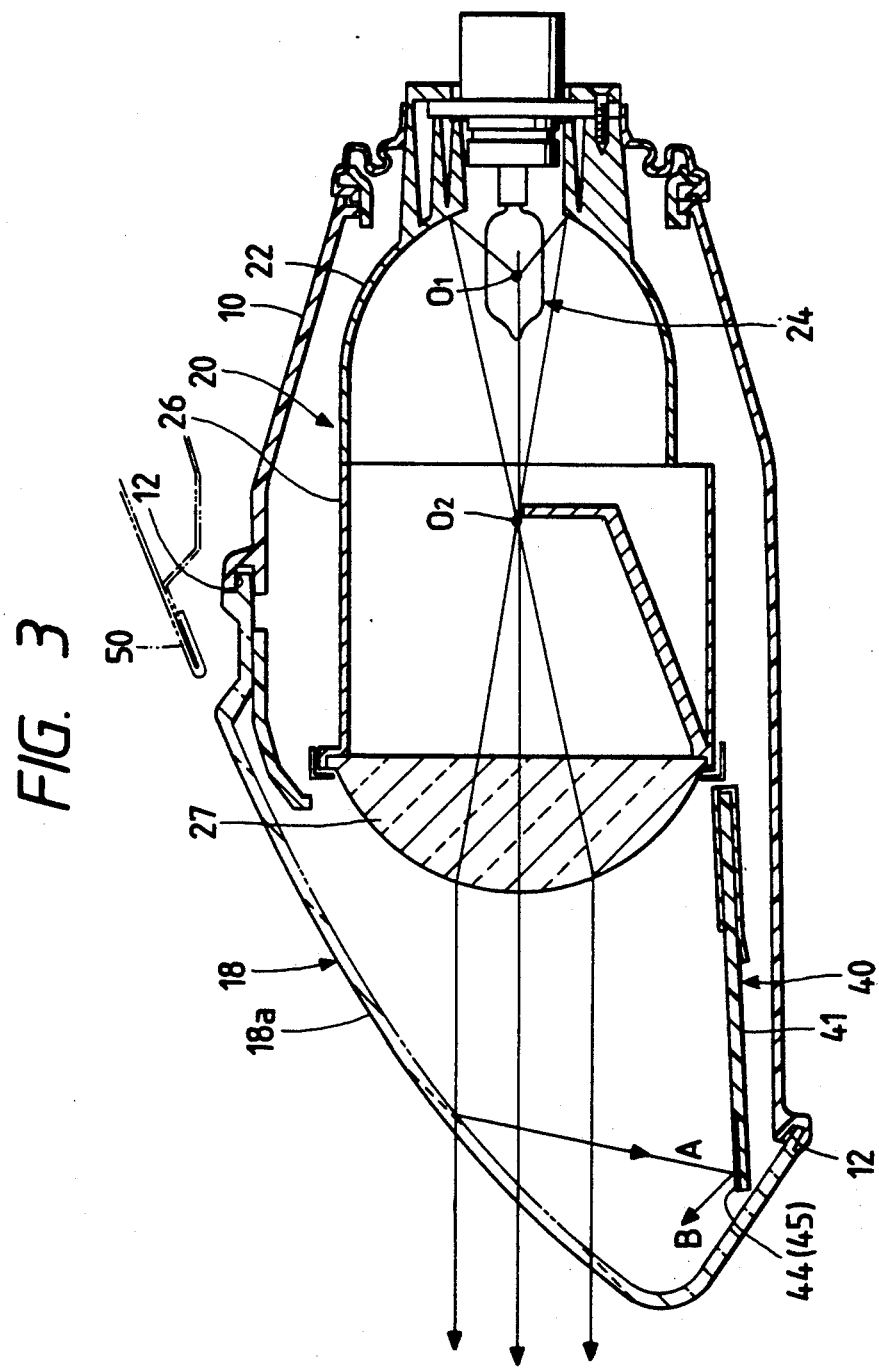
FIG. 3 is a vertical sectional view of the headlamp shown in FIG. 1 taken along a line III—III in FIG. 1.
Figure 4:
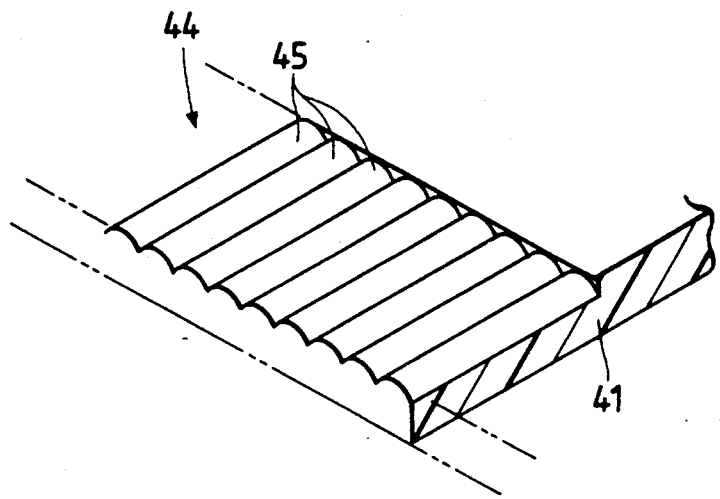
FIG. 4 is a perspective view of a light diffusing region formed in the front elongation of a cover provided in the headlamp of FIG. 1.
Figure 5:
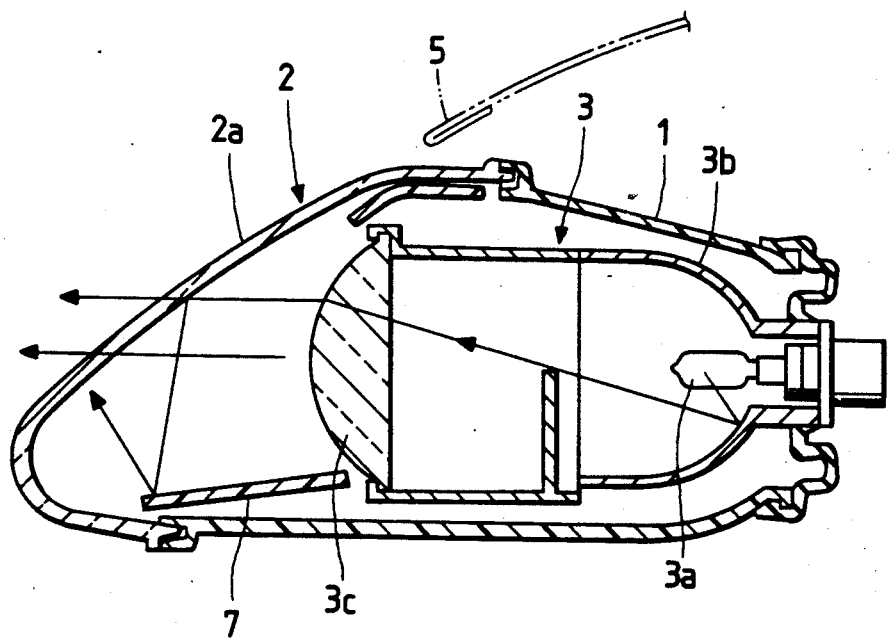
FIG. 5 is a vertical sectional view of a conventional projection-type vehicular headlamp.

A preferred embodiment of the invention is shown in FIGS. 1 through 4. Specifically, FIG. 1 is a front view of a projection-type vehicular headlamp according to the invention. FIG. 2 is a horizontal sectional view of the headlamp taken along the line II—II in FIG. 1, FIG. 3 is a vertical sectional view of the headlamp taken along the line III—III in FIG. 1, and FIG. 4 is an enlarged perspective view of a light diffusing region formed in the front extension of a cover provided in the headlamp of FIG. 1.

In these figures, reference numeral 10 designates a lamp body, which is in the form of a rectangular container as viewed from the front. The lamp body 10 has a rectangular opening at the front end which faces obliquely upward. A seal groove 12 is formed along the edge of the rectangular opening of the lamp body 10. The leg of a front lens 18 is fitted through a sealing agent in the seal groove 12. The front lens 18 is formed so that its lens region 18 is inclined strongly upward, and is streamlined in vertical section so as to conform with the configuration of the vehicle body (such as the hood) 50 (see FIG. 3). The front lens 18 and the lamp body 10 form a lamp chamber. A headlamp body, namely, a light projecting unit 20 and a clearance lamp body, are arranged side by side in the lamp chamber.

The light projecting unit 20 includes a substantially ellipsoidal mirror 22 with a bulb inserting hole 22a in the rear end portion, a light source, namely, a light bulb 24, fitted in the bulb inserting hole 22a, and a projecting lens 27 connected through a lens holder 26 to the mirror 22. The light projecting unit 20 is supported by aiming mechanisms (not shown). The filament of the light bulb 24 is located near the first focal point $O_1$ of the mirror 22. The light beam of the light bulb 24 reflected from the mirror 22 advances forwardly through the second focal point $O_2$ of the mirror 22, and it is formed into a substantially parallel light beam by the projecting lens 27. The parallel light beam thus formed is projected from the lamp after passing through the front lens 50 (see FIGS. 2 and 3). In FIG. 2, reference character L designates the optical axis of the light projecting unit 20, which can be adjusted in position by tilting the light projecting unit 20 with the aiming mechanisms.

A cover 40 is arranged around the light projecting unit 20 in such a manner that it surrounds the projecting lens 27 forming the front end portion of the light projecting unit. The cover 40 extends laterally, forming a reflector 32 for the clearance lamp body 30. That is, the cover 40 and the reflector 32 are formed as a single, continuous unit molded from synthetic resin. A mirror surface 43 is formed on the whole front surface of the cover 40 including the reflector 32 by vacuum-deposition of aluminum or plating with chromium. The cover 40 has a lower end portion which extends from near the projecting lens 27 to near the lower end portion of the front lens 18, as indicated at 41, to create a bright area around the projecting lens 27. Hence, the headlamp has an excellent appearance when turned off.

As shown in FIG. 4, a light diffusing region 44 is formed in the front end portion of the front extension 41 of the cover 40. The light diffusing region 44 is Composed of a number of axially extending cylindrical stripe-shaped members 45 arranged side by side in the form of a belt. When the light beam emerging from the projecting lens 27 passes through the front lens 18, part of it is reflected as indicated at A in FIG. 3, and then reflected by the light diffusing region 44 formed in the front end portion of the front extension 41 as indicated at B. In this operation, the light beam is diffused widely right and left by the cylindrical stripe-shaped members 45 forming the light diffusing region 44. As a result, the intensity of the light beam thus diffused upon emerging from the lamp is not so high as to cause significant glare.

The cover 40 is fixedly positioned between the lamp body 10 and the front lens 18 by coupling it to the lamp body 10 and the front lens 18 by lance engagement or with screws, or by clamping it between the lamp body 10 and the front lens 18. In the above-described embodiment, the clearance lamp reflector 32 is made integral with the cover 40; that is, the cover and the reflector can be mounted in the lamp body at the same time. Hence, the headlamp can be readily assembled when compared with the conventional headlamp in which it is necessary to separately combine the reflector with the cover.

Furthermore, in this embodiment, the surface of the cover 40 merges with the mirrored surface of the reflector 32, and therefore the inside of the lamp presents a uniform metallic color viewed through the front lens 18. Hence, when the headlamp is turned off, it has an excellent external appearance, being uniform and moderate in color distribution.

The clearance lamp body 30 includes the reflector 32, which is a part of the cover 40, a light source, namely, a light bulb 34, fitted in a bulb inserting hole 14 formed in the lamp body 10 and protruding forward through a bulb inserting hole 35 formed in the rear end portion of the reflector 32, and a hood 38 engaged with the bulb inserting hole 35 in such a manner as to surround the light bulb 34. The hood 38 is in the form of a cylinder with a dome at one end and with three hook-shaped legs 39 at the other end. The three hook-shaped legs 39 are engaged with engaging recess 36 formed in the wall of the bulb inserting hole 35 to secure the hood 38 to the reflector. The hood 38 itself is formed of a clear material. The outer cylindrical surface of the hood 38 except for the dome, that is, the outer cylindrical surface of the base end portion 38a of the hood 38, is plated with aluminum by vacuum deposition, thus appearing metallic in color. The output light beam of the light bulb 34 passes through the dome of the hood 38, which is clear.

In this case, a part of the light beam passing through the clear dome advances directly forward, while a part of the light beam advances forward after being reflected by the reflector 32. Thus, the light beam is diffused right and left by diffusing steps 19 formed on the rear surface of the front lens 18 except for the region thereof confronting the projecting lens, the diffusing steps extending vertically and arranged side by side.

The axially extending cylindrical strip-shaped members 45 formed on the front extension 41 and the diffusing steps 19 formed on the front lens 18 cooperatively produce a single alignment of vertical strips which causes a good appearance viewed from frontside of the headlamp especially when the light is turned off.

In the above-described embodiment, the light diffusing region 44 is formed by a number of cylindrical stripe-shaped members; however, the invention is not limited thereto or thereby. That is, the light diffusing region may be a rough surface such as a matte surface formed by an appropriate surface treatment.

As is apparent from the above description, in the projection-type vehicular headlamp of the invention, the light beam reflected from the inclined lens surface of the front lens is diffused by the light diffusing region formed on the front extension of the cover. Hence, the headlamp of the invention is free from the difficulty accompanying the conventional headlamp that the inclined front lens and the cover of the light projecting unit reflect light and thus cause glare.

What is claimed is:

1. A projection-type vehicular headlamp, comprising:
a lamp body;
a front lens covering a front opening of said lamp body, said front lens being an inclined lens the lens surface of which is inclined strongly rearward;
a light projecting unit comprising a substantially ellipsoidal mirror and a light source mounted within said mirror, and a projecting lens arranged in front of said light source for converting an output light beam of said light source reflected from said mirror into a substantially parallel light beam advancing forwardly of said headlamp, said light projecting unit being lens; and
a cover coated with a reflecting film arranged around a front end portion of said light projecting unit, said cover having a lower edge portion extending forward into a front extension, a light diffusing region being formed at least in a front end portion of said front extension of said cover, said light diffusing region being positioned in a band-shaped region along said front end portion of said front extension so as to receive light reflected downward from said front lens, and said light diffusing region reflecting said light reflected downward from sad reflector through said lens and laterally of said headlamp.

2. The headlamp of claim 1, wherein said light diffusing region comprises a plurality of axially extending cylindrical stripe-shaped members arranged side by side in the form of a belt.

3. The headlamp of claim 1, wherein said light diffusing region has a matte surface.

4. The headlamp of claim 1, further comprising a clearance lamp disposed in said lamp chamber.

5. The headlamp of claim 4, wherein said clearance lamp comprises a reflector formed as lateral extension of said cover, and a light bulb fitted in a bulb inserting hole formed a rear portion of said reflector.

6. The headlamp of claim 5, wherein a reflecting coating is formed on a forward surface of said cover and reflector.

7. The headlamp of claim 5, wherein said clearance lamp further comprises a hood fitted over said light bulb, said hood being in the form of a cylinder with a dome at a forward end thereof, said hood being formed of a clear material.

8. The headlamp of claim 7, wherein an outer cylindrical surface of said hood, except for said dome, is coated with a reflecting coating.

9. The headlamp of claim 7, wherein said hood has a plurality of hook-shaped legs at a rear end thereof, said legs being engaged with respective engaging recesses formed in a wall portion of said bulb inserting hole.

10. The headlamp of claim 1, wherein said cover is positioned between said lamp body and said front lens by coupling said cover to said lamp body and said front lens by lance engagement.

11. The headlamp of claim 1, wherein said cover is positioned between said lamp body and said front lens by coupling said cover to said lamp body and said front lens with screws.

12. The headlamp of claim 1, wherein said cover is positioned between said lamp body and said front lens by coupling said cover to said lamp body and said front lens by clamping said cover between said lamp body and said front lens.

13. The headlamp of claim 2, wherein diffusing steps are formed on a rear surface of said front lens except for the region thereof confronting said light projecting unit, said diffusing steps are extending vertically and arranged side by side, and said cylindrical strip-shaped members of said extension and said diffusing steps of said front lens cooperatively produce a single alignment of vertical stripes.

* * * * *